United States Patent [19]
Ishii

[11] Patent Number: 5,790,340
[45] Date of Patent: Aug. 4, 1998

[54] HEAD POSITION CONTROLLER OF MAGNETIC DISK UNIT

[75] Inventor: Satoshi Ishii, Tokyo, Japan

[73] Assignee: NEC Corporation, Tokyo, Japan

[21] Appl. No.: 355,022

[22] Filed: Dec. 13, 1994

[30] Foreign Application Priority Data

Dec. 13, 1993 [JP] Japan .................... 5-311386

[51] Int. Cl.$^6$ .................... G11B 21/02; G11B 5/596
[52] U.S. Cl. .................... 360/75; 360/77.04
[58] Field of Search .................... 360/75, 77.02, 360/77.05, 77.08, 77.04; 369/32

[56] References Cited

U.S. PATENT DOCUMENTS 4,149,201 4/1979 Card .................... 360/77.08
5,311,379 5/1994 Shinohara et al. .................... 360/77.02

FOREIGN PATENT DOCUMENTS

WO 92/05543 4/1992 WIPO .

OTHER PUBLICATIONS

Gene F. Franklin et al., "Digital Control of Dynamic Systems", Addison–Wesley Publishing Company, pp. 250–255.

Primary Examiner—Aristotelis M. Psitos
Assistant Examiner—Regina Y. Neal
Attorney, Agent, or Firm—Sughrue, Mion, Zinn, Macpeak & Seas, PLLC

[57] ABSTRACT

A head position controller computes position control information for locating the head on a target cylinder based on the head position information and the estimated position information of the head. Cylinder information recorded on the storage medium is made up of an address of a predetermined number of digits given for each cylinder and a correct address corresponding to a part of the cylinder address. The head position controller computes position control information based on the cylinder address when a first difference between a read signal of the cylinder address and a read signal of the correct address is within a fixed range, computes the position control information based on the cylinder address when the first difference is beyond the fixed range and a second difference between the cylinder address and the estimated position information of the head is smaller than a third difference between the correct address and the estimated position information of the head, and computes the position control information based on the estimated position information of the head when the second difference is larger than the third difference.

17 Claims, 6 Drawing Sheets

| CYLINDER NUMBER | NORMAL CYLINDER ADDRESS (BINARY CODE) | | | NORMAL ADDRESS CODE (GRAY CODE) | | |
|---|---|---|---|---|---|---|
| | HIGHER ORDER | MEDIUM ORDER | LOWER ORDER | HIGHER ORDER | MEDIUM ORDER | LOWER ORDER |
| 00 | 0000 | 0000 | 0000 | 0001 | 1000 | 0000 |
| 01 | | | 0001 | | | 0001 |
| 02 | | | 0010 | | | 0011 |
| 03 | | | 0011 | | | 0010 |
| 04 | | | 0100 | | | 0110 |
| 05 | | | 0101 | | | 0111 |
| 06 | | | 0110 | | | 0101 |
| 07 | | | 0111 | | | 0100 |
| 08 | | | 1000 | | | 1100 |
| 09 | | | 1001 | | | 1101 |
| 10 | | | 1010 | | | 1111 |
| 11 | | | 1011 | | | 1110 |
| 12 | | | 1100 | | | 1010 |
| 13 | | | 1101 | | | 1011 |
| 14 | | | 1110 | | | 1001 |
| 15 | | | 1111 | | | 1000 |
| 16 | | 0001 | 0000 | | 1001 | 1000 |
| 17 | | | 0001 | | | 1001 |
| 18 | | | 0010 | | | 1011 |
| 19 | | | 0011 | | | 1010 |
| 20 | | | 0100 | | | 1110 |
| 21 | | | 0101 | | | 1111 |
| 22 | | | 0110 | | | 1101 |
| 23 | | | 0111 | | | 1100 |
| 24 | | | 1000 | | | 0100 |
| 25 | | | 1001 | | | 0101 |
| 26 | | | 1010 | | | 0111 |
| 27 | | | 1011 | | | 0110 |
| 28 | | | 1100 | | | 0010 |
| 29 | | | 1101 | | | 0011 |
| 30 | | | 1110 | | | 0001 |
| 31 | | | 1111 | | | 0000 |
| 32 | | 0010 | 0000 | | 1011 | 0000 |

FIG. 4

| CORRECT CYLINDER ADDRESS | CORRECT ADDRESS CODE |
|---|---|
| 0000 | 0000 |
| 0001 | 0001 |
| 0010 | 0011 |
| 0011 | 0010 |
| 0100 | 0110 |
| 0101 | 0111 |
| 0110 | 0101 |
| 0111 | 0100 |
| 1000 | 1100 |
| 1001 | 1101 |
| 1010 | 1111 |
| 1011 | 1110 |
| 1100 | 1010 |
| 1101 | 1011 |
| 1110 | 1001 |
| 1111 | 1000 |

FIG. 5

| REGISTER NAME | CONTENTS |
|---|---|
| RG-A | NORMAL CYLINDER ADDRESS |
| RG-B | FOUR LOWER ORDER BITS OF NORMAL CYLINDER ADDRESS |
| RG-C | CORRECT CYLINDER ADDRESS |
| RG-D | ESTIMATION RESULT OBTAINED BY OBSERVER |
| RG-E | FOUR LOWER ORDER BITS OF ESTIMATION RESULT OBTAINED BY OBSERVER |

HEAD POSITION CONTROLLER OF MAGNETIC DISK UNIT

BACKGROUND OF THE INVENTION

1. Field of the Invention

The present invention generally relates to a head position controller of a disk unit with a sector servomechanism which controls positioning of the head based on a cylinder address recorded in each sector of a storage medium such as a magnetic disk.

2. Description of the Related Art

When locating a magnetic head on a target cylinder, a conventional magnetic disk unit reads a cylinder address (gray code) from a servo signal recorded in a predetermined position (sector) of each cylinder of the magnetic disk (hereinafter, referred to as storage medium) and determines a distance to a target cylinder based on the cylinder address, thereby controlling the seeking operation.

In general, magnetic disk units use a gray code, that is, a reflected binary code, as a cylinder number (cylinder address) indicative of an absolute position of each cylinder of the storage medium. Successive cylinders are expressed by gray codes such that adjacent codes are different from each other by one digit. In other words, just one mismatched bit is always found in each of adjacent gray codes.

The use of gray codes therefore enables reading of an address portion of a cylinder to the precision of the difference of 1 even when the magnetic head is to move from a cylinder whose address is to be read to its adjacent cylinder.

However, when an bit error occurs at the time of cylinder address reading, the head will be moved to an erroneous head position. This is because even if address codes are composed of gray codes, it is impossible to detect a bit error in a read gray code.

Detection of such a bit error in an address code is disclosed, for example, in Japanese Patent Laid-Open No. H3-171476, in which a bit error occurring in address code reading is detected by applying a parity bit to an address code. In addition, at least some address codes are composed of special gray codes and a table corresponding to the address codes, which is prepared in advance in a ROM, and referred to detect a bit error.

Also in the detection of bit errors by using parity bits as described in the foregoing, there is a possibility of bit errors occurring at the time of address code or parity bit reading due to defects in the storage medium or from some other causes. When a bit error occurs in a parity bit, even a normal address code read from the sector is detected to have a bit error, and so the magnetic head might be erroneously positioned.

SUMMARY OF THE INVENTION

A first object of the invention is to provide a head position controller for a disk unit which is capable of reliably controlling the positioning of the head by overcoming a bit error occurring in reading a cylinder address due to defects in a storage medium etc.

A second object of the present invention is to provide a head position controller for a disk unit capable of accurately determining a bit error occurring in cylinder address reading due to detects of a storage medium etc. to reliably prevent a head from being positioned at an erroneous position.

According to one aspect of the invention, a head position controller of a disk unit for controlling positioning of a head which executes reading and writing data from/to a storage medium, comprises:

position control information computing means for seeking information on a current position of said head based on a read signal obtained by said head by reading cylinder information recorded on said storage medium to compute position control information for locating said head on a target cylinder from the position information of the head; and head driving means for locating said head according to the computed position control information;

wherein cylinder information of said storage medium comprises an address of a predetermined number of digits given to each cylinder of said storage medium and a correct address of two or more bits corresponding to a part of the cylinder address, and wherein said head position computing means determines whether the difference between a read signal of said cylinder address and a read signal of said correct address is within a fixed range or not, and when said difference is within the fixed range, regards the read signal of said cylinder address to be normal and computing said position control information.

In the preferred embodiment, the control information computing means compares lowest order bits, up to the number of bits of said correct address, extracted from said cylinder address read from said storage medium, and said read correct address, and when the difference therebetween is within a fixed range, regards said read cylinder address to be normal to compute said position control information.

Also, the cylinder address comprises a gray code converted from said cylinder address expressed by a binary code, and the correct address comprises predetermined lower order bits of said gray code.

In the preferred embodiment, the head position controller of a disk unit further comprises decoding means for decoding a read signal of said cylinder address and a read signal of said correct address read from said storage medium to convert them into a cylinder address and a correct cylinder address of binary codes.

According to another aspect of the invention, a head position controller of a disk unit for controlling positioning of a head which executes reading and writing data from/to a reading medium, comprises:

position control information computing means for seeking current position information of said head based on a read signal obtained by said head by reading cylinder information recorded on said storage medium to compute position control information for locating said head on a target cylinder from the position information of the head;

head driving means for locating said head according to the computed position control information;

wherein the cylinder information of said storage medium comprises an address of a predetermined number of digits given to each cylinder of said storage medium and a correct address of two or more bits corresponding to a part of the cylinder address;

said control information computing means compares a read signal of said cylinder address and a read signal of said correct address to determine whether the difference therebetween is within a fixed range or not, and when said difference is within the fixed range, regards the read signal of said cylinder address as being normal and computing said position control information; and said cylinder address comprises a gray code converted from said cylinder address expressed by a binary code and said correct address is made up of predetermined lower order bits of said gray code; and decoding means for decoding a read signal of said cylinder address and a read signal of said correct address read from said storage medium to convert them into a cylinder address and a correct cylinder address of binary codes.

In the preferred construction, the control information computing means compares lowest order bits, up to the number of bits of said correct address, extracted from cylinder address read from said storage medium, and said read correct address, and when the difference therebetween is not greater than "1", regards said read cylinder address to be normal to compute said position control information.

Also, the head position controller of a disk unit further comprises:

first storing means for storing said cylinder address read from sa id storage medium;

second storing means for storing said read correct address; and third storing means for storing lowest order bits extracted from said cylinder address up to the number of bits of said correct address.

According to a further aspect of a invention, a head position controller of the disk unit for controlling positioning of a head which executes reading and writing data from/to a storage medium, comprises:

position information computing means for seeking current position information of said head based on a read signal obtained by said head by reading cylinder information recorded on said storage medium;

head position estimating means for estimating a next position to which the head is to move by calculating a speed and a direction of previously obtained head based on said head position information;

position control information computing means for locating said head on a target cylinder based on said head position information obtained by said position information computing means and the estimated position of said head obtained by said head position estimating means; and head driving means for locating said head according to the computed position control information, wherein the cylinder information of said storage medium comprises an address of a predetermined number of digits given to each cylinder of said storage medium and a correct address of two or more bits corresponding to a part of the cylinder address;

said control information computing means = determines whether a first difference between a read signal of said cylinder address and a read signal of said correct address is within a fixed range or not, and when said first difference is within the fixed range, computing said position control information based on said cylinder address; and determines when said difference is beyond the fixed range, which is larger a second difference between said cylinder address and estimated position information of said head or a third difference between said correct address and estimated position information of said head, computes said position control information based on said cylinder address when said second difference is smaller than said third difference, and computes said position control information based on the estimated position information of said head when said second difference is larger than said third difference.

In this case, the control information computing means computes said position control information based on said read cylinder address when said first difference is within a fixed range between lowest order bits, up to the number of bits of said correct address, extracted from said cylinder address read from said storage medium, and said read correct address; and when said difference is beyond the fixed range, determines which is larger a second difference between lower order bits of said cylinder address and lowest order bits, up to the number of bits of said correct address, extracted from the estimated position information of said head, or a third difference between said correct address and lower order bits of the estimated position information of said head, and when said second difference is smaller than said third difference, computes said position control information based on said cylinder address, and when said second difference is larger than said third difference, computes said position control information based the estimated position information of said head.

In the above-mentioned construction, the cylinder address comprises a gray code converted from said cylinder address expressed by a binary code; and the correct address comprises a predetermined number of lower order bits of said gray code.

In the preferred embodiment, the head position controller for a disk unit further comprises decoding means for decoding a read signal of said cylinder address and a read signal of said correct address read from said storage medium to convert them into a cylinder address and a correct address expressed by binary codes.

In the preferred embodiment, the head position controller for a disk unit further comprises:

first storing means for storing said cylinder address read from said storage medium;

second storing means for storing lowest order bits extracted from said cylinder address up to the number of bits of said correct address;

third storing means for storing said read correct address;

fourth storing means for storing said estimated position information of said head; and fifth storing means for storing lowest order bits extracted from said cylinder address as many as the number of bits of said correct address.

In the preferred embodiment, the control information computing means executes error processing when computation of said position control information based on said estimated position information of said head is successively carried out a predetermined number of times.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 2:
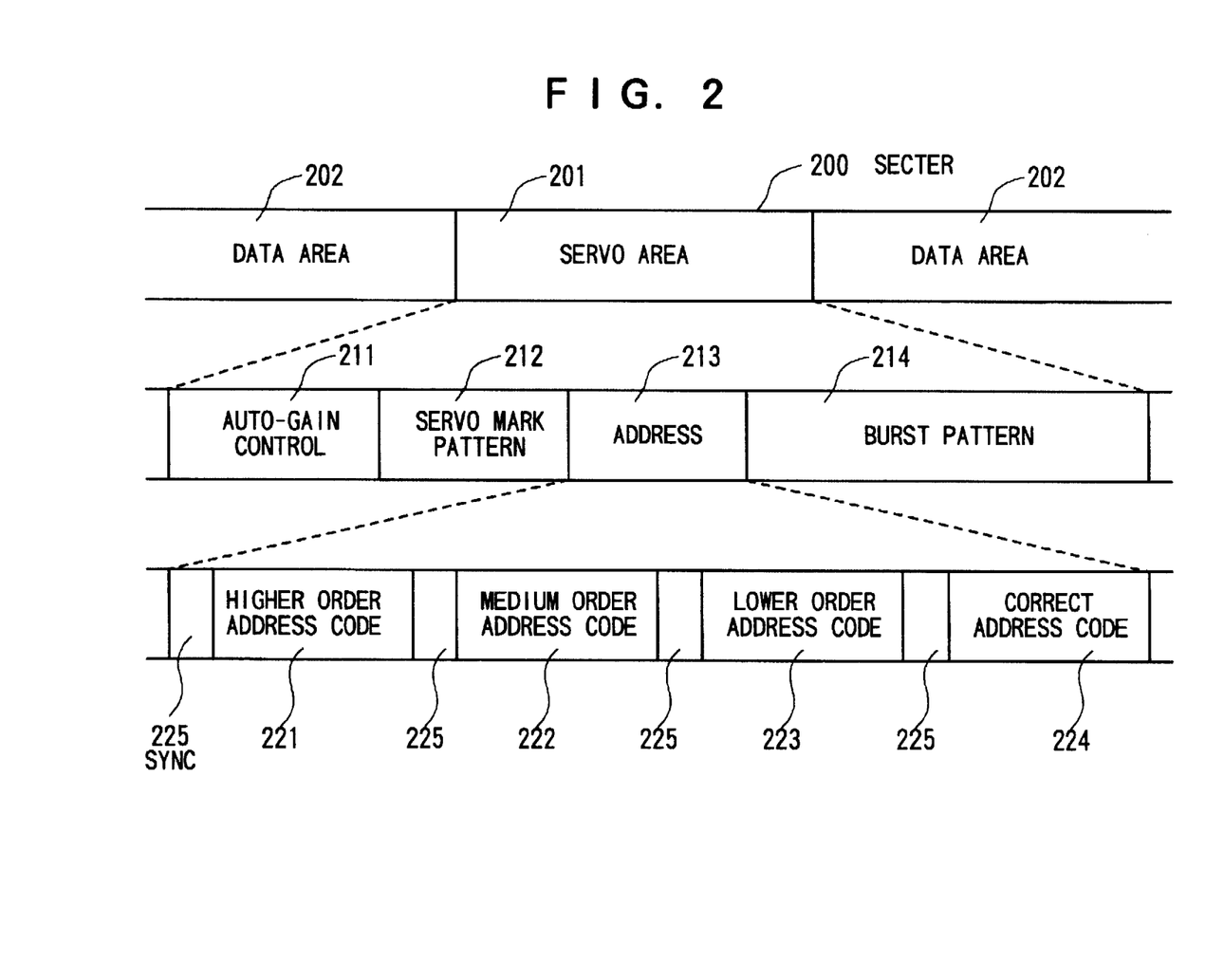
FIG. 2 is a schematic diagram illustrating an arrangement of a normal address code recorded on a storage medium.

A preferred embodiment of the present invention will be described in detail with reference to the accompanying drawings. FIG. 2 is the schematic diagram showing an arrangement of an address code recorded on the surface of a storage medium of a magnetic disk unit which controls positioning of a magnetic head by the sector servomechanism. As illustrated in FIG. 2, a servo area 201 and a data area 202 are provided in a sector 200 located circumferentially on each cylinder of the surface of a storage medium (magnetic disk).

The servo area 201 comprises an auto-gain control 211, a servo mark pattern 212, an address 213 and a burst pattern 214. The address 213 comprises a higher order address code 221, a medium order address code 222 and a lower order address code 223 of normal address codes (gray codes) and a correct address code 224. A sync bit 225 is provided between these address codes in order to facilitate synchronization in signal reading.

The auto-gain control 211 is a signal for adjusting an amplitude of an output signal of the magnetic head to be constant. The servo mark pattern 212 is a reference pattern for setting timing for reading the address 213 and the burst pattern. The address 213 indicates location information of each cylinder. The burst pattern 214, which is more detailed position control information than the above address 213, is for controlling the head's position on the cylinder indicated by the address 213.

The same address 213 is recorded in each sector of the same cylinder of the storage medium.

Figure 3:
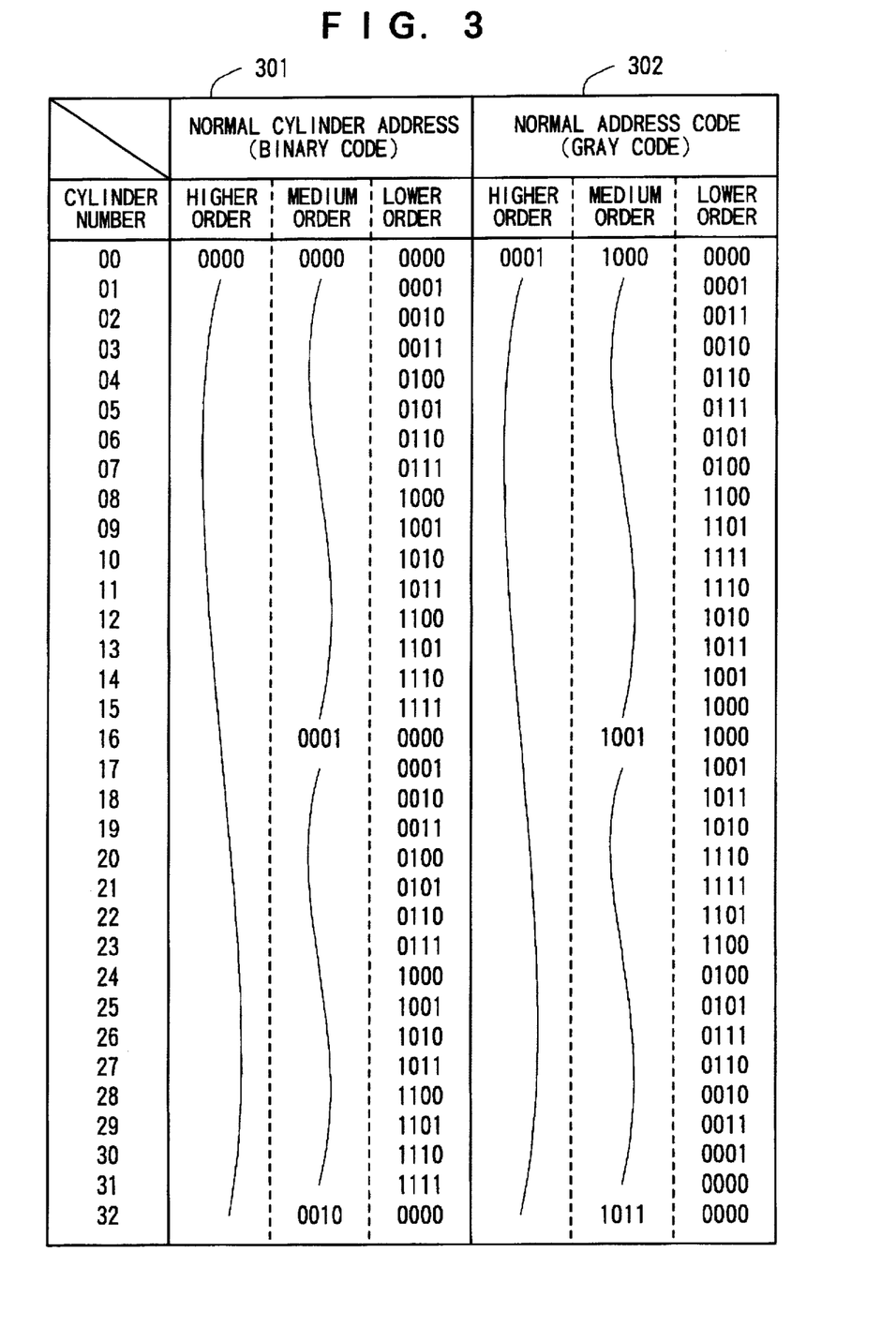
FIG. 3 is a schematic diagram showing correspondence between normal cylinder addresses and normal address codes (gray codes).

FIG. 3 shows correspondence between a normal cylinder address 301 treated in the computer as information indicative of each cylinder address of the storage medium and a normal address code 302 (gray code) recorded as the address 213 of the servo area 201 in each sector of the storage medium. The normal address code 302 is made up of the higher order address code 221, the medium order address code 222 and the lower order address code 223.

In FIG. 3, successive cylinder numbers as the normal cylinder address 301 are represented by binary codes. As the normal address code 302, gray codes are used which are obtained by converting (decoding) the normal cylinder address 301 following a predetermined procedure. The gray codes representing binary codes are arranged such that adjacent codes differ from each other in one digit. In other words, each of adjacent gray codes always includes one digit mismatched with that of its adjacent code.

Starting from the highest order bit of a binary code, each bit and its preceding bit are sequentially EXCLUSIVE ORed to convert the binary code to a gray code. Since this procedure for converting binary codes to gray codes is well known, no further detailed description will be given.

Figure 4:
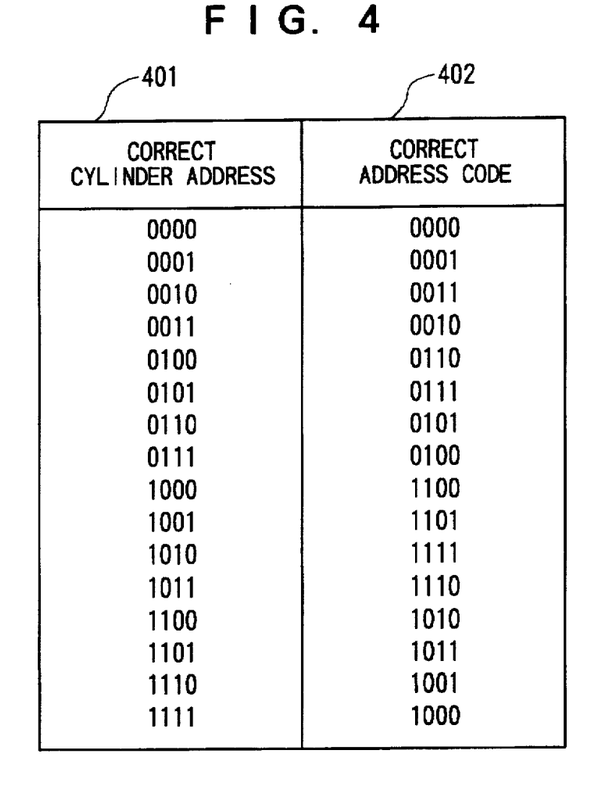
FIG. 4 is a schematic diagram showing correspondence between correct address codes expressed by gray codes and their conversions to correct cylinder addresses expressed by binary codes.

FIG. 4 is a schematic diagram showing correspondence between the correct address code 224 expressed by a gray code 402 and its conversion to a correct cylinder address 401 expressed by a binary code by decoding. Noting four lower order bits of the normal cylinder address 301 shown in FIG. 3, it can be seen that they are the repetition of the correct cylinder address 401 shown in FIG. 4. Then, conversion of four lower order bits of the normal cylinder address following a fixed procedure results in the correct address code 224 shown in FIG. 4.

As described in the foregoing, in addition to the normal address code 302 expressed by a gray code, the correct address code 224 shown in FIG. 4 is recorded in the address 213 of the servo area 201 of the storage medium in this embodiment, which correct address code 224, when being read out and decoded, will have the same contents (the correct cylinder address 401) as four lower order bits of the normal cylinder address 301 (the result of the read of the normal address code 302).

The correct address code 224 is provided for comparing four lower order bits of the normal cylinder address 301 and the correct cylinder address 401 of the same contents to detect a bit error in reading by a magnetic head 150.

Figure 1:
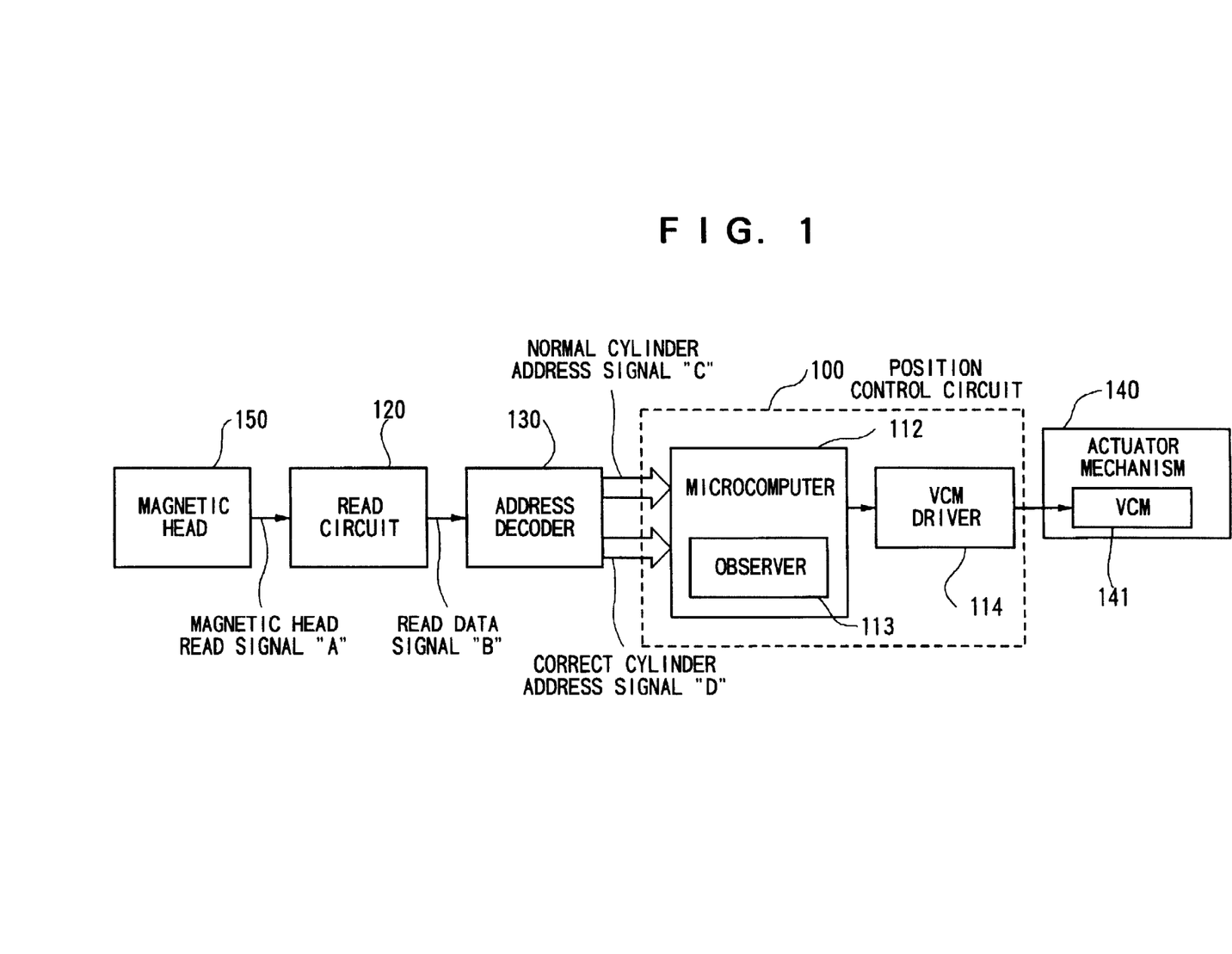
FIG. 1 is a block diagram showing an arrangement of a head position controller of a magnetic disk unit according to one embodiment of the present invention.

FIG. 1 is a block diagram showing a head position controller of a magnetic disk unit according to one embodiment of the present invention. In FIG. 1, the head position controller of the present invention comprises a read circuit 120, an address decoder 130 and a position control circuit 100.

Out of a head read signal A read from the servo area 201 of the storage medium by the magnetic head 150 which executes reading and writing of data from/to the storage medium, the read circuit 120 outputs a read signal including the higher order address code 221, the medium order address code 222, the lower order address code 223 and the correct address code 224 shown in FIG. 1 to the address decoder 130 as a read data signal B.

The address decoder 130 decodes the read data signal B received from the read circuit 120 to output a normal cylinder address signal C and a correct cylinder address signal D. More specifically, the decoder converts the normal address code 302 expressed by a gray code to the normal cylinder address 301 expressed by a binary code and the correct address code 224, the gray code, to the correct cylinder address 401, the binary code, both by decoding.

As described in the foregoing, recorded in the address 213 of the sector 200 in each cylinder are the higher order address code 221, the medium order address code 222 and the lower order address code 223 of the normal address code (gray code) shown in FIG. 3 and the correct address code 224, corresponding to 402 shown in FIG. 4.

The read signal including the higher order address code 221, the medium order address code 222 and the lower order address code 223 included in the read data signal B output from the read circuit 120 to the address decoder 130, is decoded by the address decoder 130 and converted to the normal cylinder address 301 of FIG. 3, which address 301 is output as the normal cylinder address signal C. On the other hand, the read signal of the correct address code 224 included in the read data signal B is decoded by the address decoder 130 and converted to the correct cylinder address 401 of FIG. 4, which address 401 is output as the correct cylinder address signal D.

The position control circuit 100 comprises a microcomputer 112 including an observer circuit 113, and a voice coil motor drive circuit (hereinafter, referred to as VCM drive circuit) 114.

The microcomputer 112 executes operations based on the normal cylinder address signal C and the correct cylinder address signal D read from a sector of an appropriate cylinder, and estimation of a seeking position of the magnetic head 150 made by the observer circuit 113 to obtain head position information on the current position of the magnetic head 150, while calculating a distance from the cylinder on which the magnetic head 150 is currently located to a target cylinder for positioning based on the head position information, thereby controlling positioning of the magnetic head 150.

The observer circuit 113 is a prediction observer which, based on head position information obtained by calculations up to the n-th sector of the magnetic head 150 moving on a rotating storage medium (magnetic disk), predicts head position information on the (n+1)th sector on which the magnetic head 150 is to be located. This observer 113 is provided to reduce delays in operation time of the head position information by the microcomputer 112.

The observer circuit 113 seeks traveling speed and direction of the magnetic head 150 based on the head position information obtained by calculation up to the n-th sector and predicts a next destination position of the magnetic head 150 based on the results. The function of the observer circuit 113 that predicts subsequent control information of a magnetic head based on control information up to the current position of the head is well known. One such technique is recited, for example, in Gene F. Franklin et al. "Digital Control of Dynamic Systems" (ADDISON-WESLEY PUBLISHING COMPANY). In the present embodiment, the observer circuit 113 is implemented by using these techniques.

The VCM drive circuit 114 controllably drives an actuator mechanism 140 using a voice coil motor (VCM) 141 to move the magnetic head 150 to a target cylinder based on the head position information obtained by the microcomputer 112.

Figure 5:
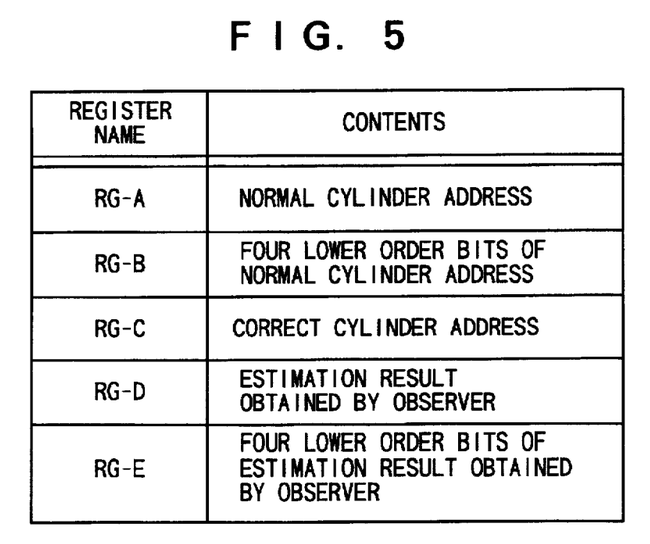
FIG. 5 is a diagram showing registers in a microcomputer shown in FIG. 1 and contents thereof.

FIG. 5 is a diagram showing registers provided in the microcomputer 112 and the contents thereof. In FIG. 5, the microcomputer 112 is provided with five registers, RG-A, RG-B, RG-C, RG-D and RG-E.

The register RG-A stores the normal cylinder address 301 converted based on a read signal of a gray code from the storage medium, the register RG-B stores four lower order bits of the normal cylinder address 301 and the register RG-C stores the correct cylinder address 401. The register RG-D stores the estimation results of the head position information obtained by the observer circuit 113 and the register RG-E stores four lower order bits of the estimation results obtained by the observer circuit 113.

Figure 6:
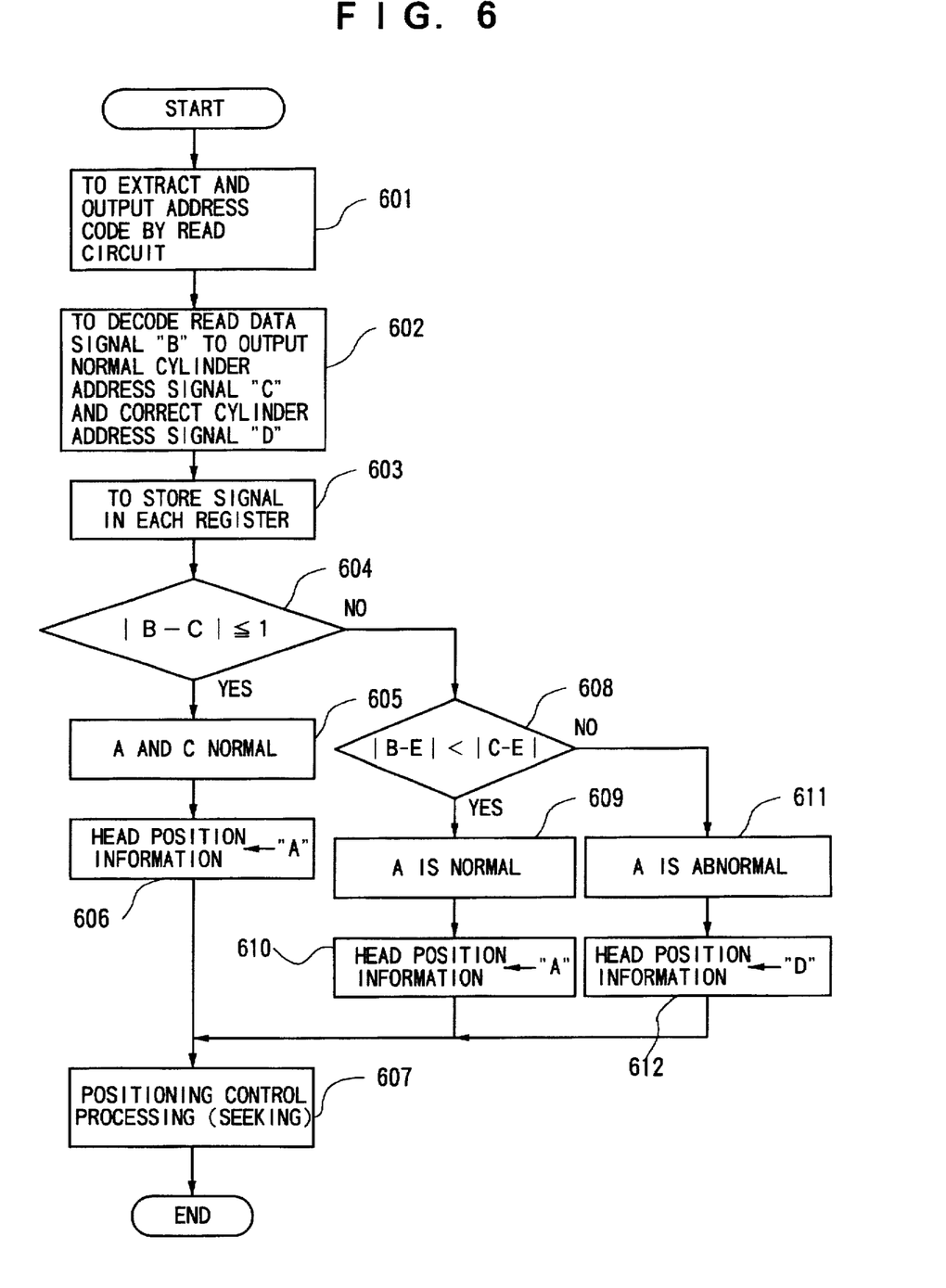
FIG. 6 is a flow chart illustrating processing by a head position controller according to the present embodiment.

Following the flow chart shown in FIG. 6, a description will be given of the processing by the head position controller according to the present embodiment.

When the computer side issues access instructions, including an address of a target cylinder (normal cylinder address), to the magnetic disk unit, the magnetic head 150 first reads a signal from the servo area 201 in a sector of an appropriate cylinder while moving on the rotating storage medium (magnetic disk), and meanwhile the read circuit 120 extracts the read data signals B including the higher order address code 221, the medium order address code 222, the lower order address code 223 and the correct address code 224 from the read magnetic head read signal A and outputs the read data signal B to the address decoder 130 (Step 601).

The address decoder 130 receives and decodes the read data signal B to output the normal cylinder address signal C and the correct cylinder address signal D to the microcomputer 112 (Step 602). Then, the microcomputer 112 stores the normal cylinder address 301 obtained from the normal cylinder address signal C in the register RG-A, the four lower order bits of the normal cylinder address 301 in the register RG-B and the correct cylinder address 401 obtained from the correct cylinder address signal D in the register RG-C.

The estimated position of a sector, which is made by the observer circuit 113 in the microcomputer 112 based on the head position information up to the (n–1)th sector preceding the current sector (n-th sector), is regarded as an estimation result to be used for the current sector (n-th sector). Then, in the microcomputer 112, the register RG-D stores a result of an estimation of a sector position obtained from the head position information up to the (n–1)th sector preceding the current sector (n-th sector) and the register RG-E stores four lower order bits of the estimation result (Step 603).

Then, the microcomputer 112 executes the following control processing by using the normal cylinder address 301 and the correct cylinder address 401, and the estimation results obtained by the observer circuit 113.

First, comparison is made between four lower order bits of the normal cylinder address 301 stored in the register RG-B and the correct cylinder address 401 stored in the register RG-C (Step 604). When the comparison finds the difference to be "1" or less, determination is made that both are normal the normal cylinder address 301 stored in the register RG-A and the correct cylinder address 401 stored in the register RG-C (Step 605) to select the normal cylinder address 301 stored as the head position information in the register RG-A (Step 606). Thereafter, processing for controlling positioning of the magnetic head 150 is carried out by calculating a distance from the cylinder in which the magnetic head 150 is currently located to a target cylinder (cylinder to be accessed according to instructions) based on the selected normal cylinder address 301 (Step 607).

In the foregoing, a bit error of the normal cylinder address 301 is determined based on whether the difference is "1" or less between four lower order bits of the normal cylinder address 301 stored in the register RG-B and the correct cylinder address 401 stored in the register RG-C. The following is the reason why the reference value for the determination is not "0" but "1" in this case.

When the magnetic head 150 reads only the correct address code 224 from a sector of one of adjacent cylinders, the difference between the four lower order bits of the normal cylinder address 301 and the correct cylinder address 401 will be "1" as indicated in FIGS. 3 and 4. In this case, the read normal cylinder address 301 is correct even if the difference is "1". In view of such situation, the normal cylinder address 301 is regarded as being correct when the difference is "1" or less.

It is clear that when the normal cylinder address 301 and the correct cylinder address 401 read from the same sector of the same cylinder are correct, the difference will be "0" between four lower order bits of the normal cylinder address 301 stored in the register RG-B and the correct cylinder address 401 stored in the register RG-C.

When the difference is greater than "1" between four lower order bits of the normal cylinder address 301 stored in the register RG-B and the correct cylinder address 401 stored in the register RG-C in Step 604, comparison is made between the difference between four lower order bits of the normal cylinder address 301 stored in the register RG-B and four lower order bits of the estimation result obtained by the observer circuit 113 based on the head position information on the preceding sector and stored in the register RG-E and the difference between the correct cylinder address 401 stored in the register RG-C and four lower order bits of the estimation result stored in the register RG-E (Step 608).

Then, if the former difference between the register RG-B and the register RG-E is smaller, determination is made that the normal cylinder address 301 stored in the register RG-A is normal and the correct cylinder address 401 stored in the register RG-C is abnormal (Step 609) to select the normal cylinder address 301 stored as the head position information in the register RG-A (Step 610). Thereafter, processing is carried out for controlling positioning of the magnetic head 150 (Step 607).

When the latter difference between the register RG-C and the register RG-E is smaller, determination is made that the normal cylinder address 301 stored in the register RG-A is abnormal and the correct cylinder address 401 stored in the register RG-C is normal (Step 611) to select the estimation result obtained by the observer circuit 113 from the information on the preceding sector and stored as the head position information in the register RG-D (Step 612). Thereafter, processing for controlling positioning of the magnetic head 150 is carried out by calculating a distance from the cylinder in which the magnetic head 150 is currently located to a target cylinder (cylinder to be accessed according to instructions) based on the selected estimation results (Step 607).

In the above processing, however, successive selection of estimation results obtained by the observer circuit 113 from the information on the preceding sector and stored as the head information in the register RG-D will gradually increase an error in the head position information, resulting in preventing access to a target cylinder. In this case, there is a possibility of a physical failure occurring on the storage medium.

Figure 7:
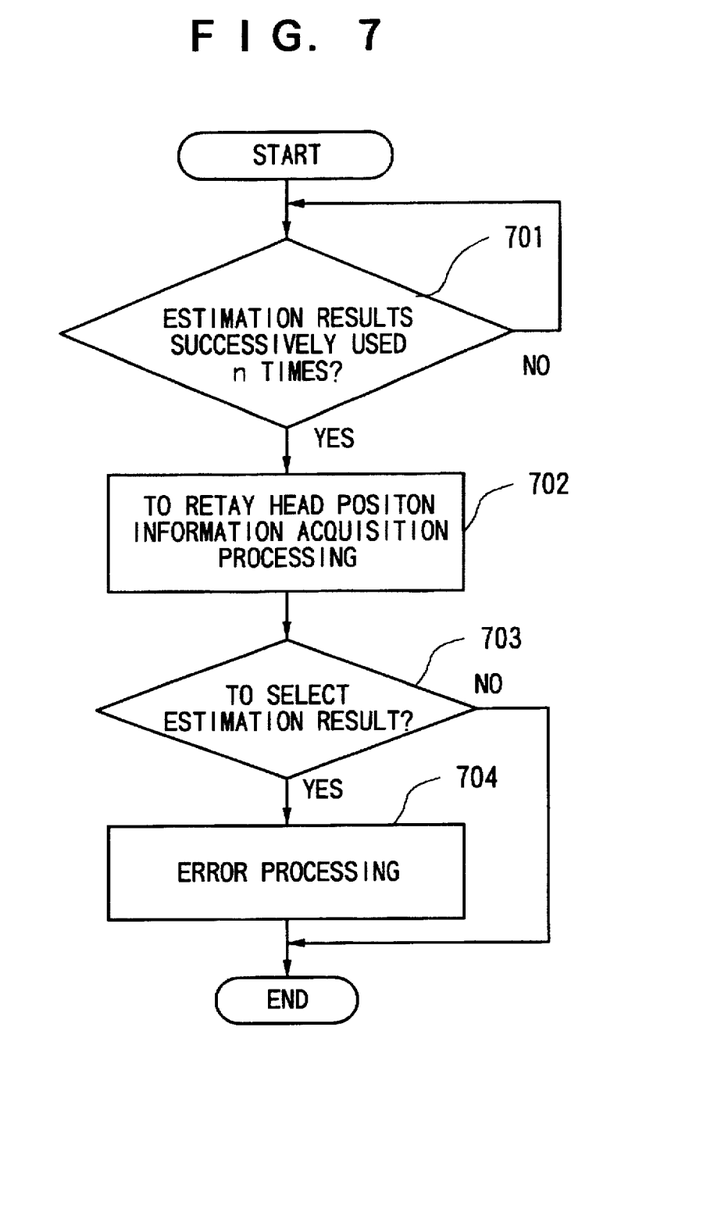
FIG. 7 is a flow chart illustrating error processing by the head position controller shown in FIG. 6.

When the estimation results obtained by the observer circuit 113 from the information on the preceding sector and stored as the head position information in the register RG-D are successively selected more than a certain number of times (the number is arbitrary), the above-described problem can be avoided by executing error processing as shown in FIG. 7 in advance.

First, determination is made whether or not the estimation results obtained by the observer circuit 113 from the information on the preceding sector and stored as the head position information in the register RG-D have been successively selected as many times as a fixed number "n" (Step 701). When the estimation results have been successively selected n times, the processing for acquiring the head position information shown in FIG. 6 is retired (Step 702).

As a result, when the estimation result is subsequently selected as the head position information (Step 703), an error message is issued to the computer side that no seeking is possible (Step 704).

As described in the foregoing, the present embodiment enables stable control of positioning of the magnetic head by overcoming a bit error of a cylinder address due to detects in a storage medium.

Although in this embodiment four lower order bits of the normal cylinder address are converted for use as the correct cylinder address as shown in FIG. 4, the present invention is not limited thereto but can use more than four lower order bits of the normal cylinder address as the correct cylinder address to further improve bit error detection precision.

As described above, the head position controller according to the present invention can accurately determine a bit error occurring at the time of reading an address code due to defects in the storage medium, etc. even if the error changes the address code into a different one, thereby preventing the magnetic head from moving to an erroneous position.

While the above embodiment is an example of the magnetic disk unit applying the present invention, it is obvious that the embodiment is applicable to other disk units such as optical disk and magneto-optical disk devices as long as they use gray codes as cylinder addresses.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A head position controller of a disk unit for controlling positioning of a head which executes reading and writing data from/to a storage medium, comprising:

a position control information computing means for seeking information on a current position of said head based on a read signal obtained by said head by reading cylinder information recorded on said storage medium to compute position control information for locating said head on a target cylinder from the position information of the head; and head driving means for locating said head according to the computed position control information;

wherein the cylinder information of said storage medium comprises a cylinder address of a predetermined number of digits given to each cylinder of said storage medium and a correct address of two or more bits corresponding to a part of the cylinder address, and wherein said position control information computing means determines whether a difference between a read signal of said cylinder address and a read signal of said correct address is within a fixed range or not, and when said difference is within the fixed range, regards the read signal of said cylinder address to be normal and computes said position control information.

2. The head position controller of a disk unit according to claim 1, wherein said control information computing means compares lowest order bits, up to the number of bits of said correct address, extracted from said cylinder address read from said storage medium, and said read correct address, and when the difference therebetween is within a fixed range, regards said read cylinder address to be normal to compute said position control information.

3. The head position controller of a disk unit according to claim 1, wherein said cylinder address comprises a gray code converted from said cylinder address expressed by a binary code, and said correct address comprises predetermined lower order bits of said gray code.

4. The head position controller of a disk unit according to claim 3, further comprising decoding means for decoding a read signal of said cylinder address and a read signal of said correct address read from said storage medium to convert them into a cylinder address and a correct cylinder address of binary codes.

5. A head position controller of a disk unit for controlling positioning of a head which executes reading and writing data from/to a storage medium, comprising:

position control information computing means for seeking current position information of said head based on a read signal obtained by said head by reading cylinder information recorded on said storage medium to compute position control information for locating said head on a target cylinder from the position information of the head;

head driving means for locating said head according to the computed position control information;

wherein the cylinder information of said storage medium comprises a cylinder address of a predetermined number of digits given to each cylinder of said storage medium and a correct address of two or more bits corresponding to a part of the cylinder address;

wherein said position control information computing means compares a read signal of said cylinder address and a read signal of said correct address, determines whether a difference therebetween is within a fixed range or not, and when said difference is within the fixed range, regards the read signal of said cylinder address as being normal and computes said position control information; and wherein said cylinder address comprises a gray code converted from said cylinder address expressed by a binary code and said correct address is made up of predetermined lower order bits of said gray code; and decoding means for decoding a read signal of said cylinder address and a read signal of said correct address read from said storage medium to convert them into a cylinder address and a correct cylinder address of binary codes.

6. The head position controller of a disk unit according to claim 5, wherein said control information computing means compares lowest order bits, up to the number of bits of said correct address, extracted from said cylinder address read from said storage medium, and said read correct address, and when the difference therebetween is not greater than "1", regards said read cylinder address to be normal to compute said position control information.

7. The head position controller of a disk unit according to claim 6, further comprising:

first storing means for storing said cylinder address read from said storage medium;

second storing means for storing said read correct address; and third storing means for storing lowest order bits extracted from said cylinder address up to the number of bits of said correct address.

8. The head position controller of a disk unit according to claim 5, wherein said position control information computing means calculates said difference.

9. A head position controller of a disk unit for controlling positioning of a head which executes reading and writing data from/to a storage medium, comprising:

position information computing means for seeking current position information of said head based on a read signal obtained by said head by reading cylinder information recorded on said storage medium;

head position estimating means for estimating a next position to which the head is to move by calculating a speed and a direction of said head based on previously obtained head position information;

position control information computing means for locating said head on a target cylinder based on said head position information obtained by said position information computing means and the estimated position of said head obtained by said head position estimating means; and head driving means for locating said head according to the computed position control information, wherein the cylinder information of said storage medium comprises a cylinder address of a predetermined number of digits given to each cylinder of said storage medium and a correct address of two or more bits corresponding to a part of the cylinder address; and wherein said control information computing means determines whether a first difference between a read signal of said cylinder address and a read signal of said correct address is within a fixed range or not, and when said first difference is within the fixed range, computes said position control information based on said cylinder address; and wherein said control information computing means determines, when said first difference is beyond the fixed range, which is the larger of a second difference between said cylinder address and estimated position information of said head and a third difference between said correct address and estimated position information of said head, computes said position control information based on said cylinder address when said second difference is smaller than said third difference, and computes said position control information based on the estimated position information of said head when said second difference is larger than said third difference.

10. The head position controller of a disk unit according to claim 9, wherein said cylinder address comprises a gray code converted from said cylinder address expressed by a binary code; and said correct address comprises a predetermined number of lower order bits of said gray code.

11. The head position controller for a disk unit according to claim 10, further comprising decoding means for decoding a read signal of said cylinder address and a read signal of said correct address read from said storage medium to convert them into a cylinder address and a correct address expressed by binary codes.

12. The head position controller for a disk unit according to claim 9, wherein said control information computing means executes error processing when computation of said position control information based on said estimated position information of said head is successively carried out a predetermined number of times.

13. The head position controller of a disk unit according to claim 9, wherein said control information computing means calculates said first difference, said second difference and said third difference.

14. The head position controller of a disk unit according to claim 1, wherein said position control information computing means calculates said difference.

15. The head position controller of a disk unit for controlling positioning of a head which executes reading and writing data from/to a storage medium, comprising:

position information computing means for seeking current position information of said head based on a read signal obtained by said head by reading cylinder information recorded on said storage medium;

head position estimating means for estimating a next position to which the head is to move by calculating a speed and a direction of said head based on previously obtained head position information;

position control information computing means for locating said head on a target cylinder based on said head position information obtained by said position information computing means and the estimated position of said head obtained by said head position estimating means; and head driving means for locating said head according to the computed position control information;

wherein the cylinder information of said storage medium comprises a cylinder address of a predetermined number of digits given to each cylinder of said storage medium and a correct address of two or more bits corresponding to a part of the cylinder address;

wherein said control information computing means determines whether a first difference between a read signal of said cylinder address and a read signal of said correct address is within a fixed range or not;

wherein said control information computing means computes said position control information based on said cylinder address when said first difference is within the fixed range between lowest order bits, up to the number of bits of said correct address extracted from said cylinder address read from said storage medium, and said correct address; and when said difference is beyond the fixed range, determines which is the larger of a second difference between lower order bits of said cylinder address and lowest order bits, up to the number of bits of said correct address, extracted from the estimated position information of said head, and a third difference between said correct address and lower order bits of the estimated position information of said head, and when said second difference is smaller than said third difference, computes said position control information based on said cylinder address, and when said second difference is larger than said third difference, computes said position control information based on the estimated position information of said head.

16. The head position controller of a disk unit according to claim 15, further comprising:

first storing means for storing said cylinder address read from said storage medium;

second storing means for storing lowest order bits extracted from said cylinder address up to the number of bits of said correct address;

third storing means for storing said read correct address;

fourth storing means for storing said estimated position information of said head; and fifth storing means for storing lowest order bits extracted from said estimated position information up to the number of bits of said correct address.

17. The head position controller of a disk unit according to claim 15, wherein said control information computing means calculates said first difference, said second difference and said third difference.

* * * * *

UNITED STATES PATENT AND TRADEMARK OFFICE
CERTIFICATE OF CORRECTION

PATENT NO. : 5,790,340
DATED : August 4, 1998
INVENTOR(S) : Satoshi ISHII

It is certified that error appears in the above-indentified patent and that said Letters Patent is hereby corrected as shown below:

On title page, item [54] and col. 1, line 2, in the title, after "UNIT" insert --FOR DETERMINING AND OVERCOMING BIT ERRORS DUE TO DISK DEFECTS--.

Col. 3, line 20, change "sa id" to --said--.

Signed and Sealed this

Fifth Day of October, 1999

*Attest:*

Q. TODD DICKINSON

*Attesting Officer*  *Acting Commissioner of Patents and Trademarks*